United States Patent
Allen et al.

(10) Patent No.: US 10,572,473 B2
(45) Date of Patent: Feb. 25, 2020

(54) OPTIMIZED DATA VISUALIZATION ACCORDING TO NATURAL LANGUAGE QUERY

(71) Applicant: International Business Machines Corporation, Armonk, NY (US)

(72) Inventors: Corville O. Allen, Morrisville, NC (US); Andrew Ronald Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 14/049,398

(22) Filed: Oct. 9, 2013

(65) Prior Publication Data

US 2015/0100588 A1    Apr. 9, 2015

(51) Int. Cl.
*G06F 16/25* (2019.01)
*G06F 16/242* (2019.01)

(52) U.S. Cl.
CPC ................. *G06F 16/243* (2019.01)

(58) Field of Classification Search
CPC ........... G06N 5/02; G06N 5/00; G06N 20/00; G06N 5/04; G06F 17/30684; G06F 17/30864; G06F 17/30424; G06F 16/24578; G06F 16/287; G06F 16/90335; G06F 16/904; G06F 17/5009; G06F 2217/16; G06F 9/06; Y10S 707/99943
USPC ............... 707/748, 759, 763, 798, 805, 603
See application file for complete search history.

(56) References Cited

U.S. PATENT DOCUMENTS

| | | | |
|---|---|---|---|
| 6,701,294 B1 | 3/2004 | Ball et al. | |
| 7,546,577 B2* | 6/2009 | Do | G06F 8/20 717/108 |
| 8,126,825 B2* | 2/2012 | Guyon | G06K 9/6231 706/12 |
| 8,661,023 B1* | 2/2014 | Chun | G06F 17/30961 707/718 |
| 8,812,947 B1* | 8/2014 | Maoz | G06F 17/246 715/212 |

(Continued)

OTHER PUBLICATIONS

Anonymous; "Methods and systems for processing collected data", Jun. 15, 2012.

(Continued)

*Primary Examiner* — Alex Gofman
*Assistant Examiner* — Linh Black
(74) *Attorney, Agent, or Firm* — Reza Sarbakhsh

(57) ABSTRACT

An optimal visualization format for a data corpus is automatically selected and generated based upon a natural language query or statement about the data corpus from a user by accessing the subject data corpus; receiving the query or statement from the user a natural language expression; identifying symbols in the query or statement through natural language processing; mapping the symbols to weights for a plurality of visualization formats; scoring the visualization formats; and generating a visualization of the subject data corpus according to the scores. Optional metadata, such as row and column labels, database field labels, and XML DTD's may be mined for symbols, as well. The new tool may generate the visualization as a digital image file, a digital document file, a digital movie file, a digital three-dimensional model file, or a combination of these.

18 Claims, 5 Drawing Sheets

(56) References Cited

U.S. PATENT DOCUMENTS

| | | | |
|---|---|---|---|
| 8,825,649 B2* | 9/2014 | Heimendinger | G06F 17/30522 707/737 |
| 9,053,571 B2* | 6/2015 | Shotton et al. | |
| 9,208,223 B1* | 12/2015 | Patil | G06F 17/30342 |
| 9,779,260 B1* | 10/2017 | Brisebois | G06F 21/62 |
| 2003/0071814 A1* | 4/2003 | Jou | G06F 9/542 345/440 |
| 2006/0173812 A1* | 8/2006 | Bahl | G06F 17/30592 |
| 2007/0226204 A1* | 9/2007 | Feldman | G06F 16/30 |
| 2008/0077570 A1* | 3/2008 | Tang | G06F 16/3344 |
| 2008/0154828 A1* | 6/2008 | Antebi | G06N 5/022 706/46 |
| 2009/0144222 A1 | 6/2009 | Modzelewski | |
| 2009/0228299 A1* | 9/2009 | Kangarloo et al. | 705/2 |
| 2010/0094878 A1* | 4/2010 | Soroca | G06Q 30/02 707/748 |
| 2010/0169340 A1* | 7/2010 | Kenedy | G06Q 30/02 707/758 |
| 2010/0228693 A1* | 9/2010 | Dawson | G06F 17/2705 706/12 |
| 2011/0029853 A1 | 2/2011 | Garrity et al. | |
| 2011/0080408 A1 | 4/2011 | Neelakantan et al. | |
| 2011/0246458 A1* | 10/2011 | Tuchman | G06F 17/30864 707/728 |
| 2011/0258049 A1* | 10/2011 | Ramer | G06Q 30/02 705/14.66 |
| 2011/0271179 A1 | 11/2011 | Jasko et al. | |
| 2012/0166371 A1* | 6/2012 | Sweeney et al. | 706/14 |
| 2013/0204886 A1* | 8/2013 | Faith | G06Q 30/0631 707/756 |
| 2013/0332371 A1* | 12/2013 | Barton | G06Q 50/18 705/311 |
| 2014/0249998 A1* | 9/2014 | Gotanda | G07G 5/00 705/39 |
| 2015/0131887 A1* | 5/2015 | Racine | G06K 9/6267 382/133 |
| 2015/0169758 A1* | 6/2015 | Assom | G06F 16/36 707/603 |

OTHER PUBLICATIONS

Anonymous; Summary of "Heuristics based context aware method to automatically convert large data table in severalSpreadsheets into representative visualizations", Jul. 6, 2012.

Kuchmann-Beauger, N. et al.; "Natural Language Interface for Data Warehouse Question Answering", Jan. 2011.

Well, J.;"Semantic Representation and Visualization of Natural Language Text", Jan. 2012.

Chandoo; "Bonavista Chart Tamer Kicks ass"; retrieved on Sep. 3, 2013 from http://chandoo.org/wp/2009/05/04/review-chart-tamer.

Chandoo; "How to Select Right Chart for your Data"; retrieved on Sep. 3, 2013 from http://chandoo.org/wp/2010/04/19/chart-selection-process/.

Creativebloq; "The 20 best tools for data visualization"; retrieved on Sep. 3, 2013 from http://www.creativebloq.com/design-tools/data-visualization-712402.

Perceptualedge; "Effectively Communicating Numbers Selecting the Best Means and Manner of Display"; Retrieved on Sep. 3, 2013 from http://www.perceptualedge.com/articles/Whitepapers/Communicating_Numbers.pdf.

IBM; "Many Eyes"; retrieved on Sep. 24, 2013 from http://www-958.ibm.com/software/analytics/manyeyes/visualizations.

IBM; "Many Eyes—Tour"; retrieved on Sep. 24, 2013 from http://www-958.ibm.com/software/analytics/manyeyes/page/Tour.html.

Boxesandarrows' "What is Controlled Vocabulary" retrieved on Sep. 30, 2013 from http://boxesandarrows.com/what-is-a-controlled-vocabulary/.

Mind; "Introduction to Logic for ProtoThinker"; retrieved on Sep. 5, 2013 from http://www.mind.ilstu.edu/curriculum/protothinker/logic_intro.php?mod.

Allaboutpresentations; "Which type of chart should you use?"; retrieved on Sep. 3, 2013 from http://www.allaboutpresentations.com/2009/09/14-charting-tips-tip-2-wh.

Čyras, Vytautas; "Distinguishing Between Knowledge Visualization and Knowledge Representation in Legal Informatics", Vilnius University, Faculty of Mathematics and Informatics; Jusletter IT, Sep. 1, 2009.

Davis, Randall, et al.; "What is a Knowledge Representation?", Artificial Intelligence Magazine, vol. 14, No. 1, 1983.

* cited by examiner

OPTIMIZED DATA VISUALIZATION ACCORDING TO NATURAL LANGUAGE QUERY

FIELD OF THE INVENTION

The invention generally relates automated methods, systems and tools which select and prepare a data visualization or graphical representation according to a user's natural language query and descriptive information about the subject data set.

BACKGROUND OF INVENTION

Two-dimensional data such as data which is represented in "flat" tables or spreadsheets is often converted into graphical visualizations such as pie charts, bar graphs, and the like. Such two-dimensional data can be described as having "meta-data" at least in the form of the row names and the column names. The graphical visualizations can be presented using colors and line styles (dashed, dotted, etc.) to make the data more easily discerned by a viewer. Some spreadsheet program have graphing "wizards" which help the user configure a particular chart type, but they generally do not assist in picking the chart type which conveys the information that the user wants to communicate about the data.

It turns out that there are two reasons to chart data. The first is to illustrate some property or relationship of the data that is already known about the data in order to assist a presenter in showing the property, relationship or pattern to someone else. The second reason can be to explore and investigate the data, when patterns, relationships, correlations and properties are not known but may be suspected.

When the data is multi-dimensional above two-dimensions, it becomes exponentially more difficult to graph or visualize because human brains are particularly limited in their abilities to comprehend multi-dimensional data. For example, three-dimensional data can be illustrated in rotated and tilted "perspective views", with three axes set to multiples of 30° or 60°. All three-dimensional data properties do not lend themselves to these types of representations using three apparently orthogonal axes which are actually reflected onto a two-dimensional medium such as paper or a flat computer screen.

When the known property of the data is complex, or when the data is multi-dimensional and the properties are unknown, then choosing the "best" visualization format can be something of a black art. For example, "Chart Tamer"™ by Bonavista is a plug-in helper program for the Microsoft Excel spreadsheet program which adds a button to the Excel menu bar. When a user wishes to create a data visualization or chart, he or she clicks on the Chart Tamer button and is provided a pop-up menu which includes a list of checkboxes in which the user indicates the data relationship (or property) that he or she wishes to illustrate or investigate, including value comparison, time series, part-to-whole ranking, correlation, distribution (multiple or single). This, however, requires a certain level of expertise on the user's part to even know what these "relationships" are and to suspect that such a relationship exists in the data. For data which is relatively unknown in its characteristics, or for relatively novice users, such a menu can fall short. Other software programs, web-based services and helper plug-ins provide similar menus of choices from which the user must select, such as iCharts™, Flot™, Raphael™, Modest Maps™, Leaflet™, WolframAlpha™, Visual.ly™, jQuery Visualize™, jqPlot™, IBM's ManyEyes™ (167,562 different visualization types and growing), Google Charts, etc.

Separately, there are texts books and online advice columns which provide users with example rules of thumb and anecdotal examples of how to pick the best data visualization for a particular data set or to show a particular characteristic of the data. For example, one such online resource (Chandoo<dot> org) lists the six common purposes for visualizing data as to compare, to show a distribution, to explain parts of a whole, to show a trend over time, to find deviations, and to understand a relationship. This correlates well and nearly one-to-one with the options provided in the Chart Tamer™ plug-in for Excel previously discussed, and shares the same requirement that the user understand the data and the visualization impact.

Both the Chandoo advice and the Chart Tamer helper program then map the user's choice (e.g. time series, parts of to the whole, distribution, etc.) to one or more actual chart types, such as:

(a) to compare two sets of data, use bar charts, column charts, scattergrams, pie charts, line charts or data tables;

(b) to illustrate distribution, use column charts, scattergrams, line charts or box plots;

(c) to show how parts of the data set contribute to the whole data set, use bar charts, column charts, pie charts, line charts or data tables; etc.

From this short list of mapping purposes or reasons for visualizing data to possible chart types or chart formats, there is apparent aliasing in the mapping in that the chart options for comparing two sets of data are essentially the same as the chart options for parts-of-the-whole demonstrations. This may be because parts-of-the-whole illustrations are actually a species of comparing two data sets, wherein one data set is just a subset (e.g. part) of the whole set, e.g. there is 100% overlap between first set (the part) with the second set (the whole).

Such a situation, then, produces a quandary for a novice user, or for a user investigating a data set containing unknown or unidentified characteristics.

SUMMARY OF THE INVENTION

An optimal visualization format for a data corpus is automatically selected and generated based upon a natural language query or statement about the data corpus from a user by accessing the subject data corpus; receiving the query or statement from the user a natural language expression; identifying symbols in the query or statement through natural language processing; mapping the symbols to weights for a plurality of visualization formats; scoring the visualization formats; and generating a visualization of the subject data corpus according to the scores. Optional meta-data, such as row and column labels, database field labels, and XML DTD's may be mined for symbols, as well. The new tool may generate the visualization as a digital image file, a digital document file, a digital movie file, a digital three-dimensional model file, or a combination of these.

BRIEF DESCRIPTION OF THE DRAWINGS

The description set forth herein is illustrated by the several drawings.

DETAILED DESCRIPTION OF EMBODIMENT(S) OF THE INVENTION

Figure 1:
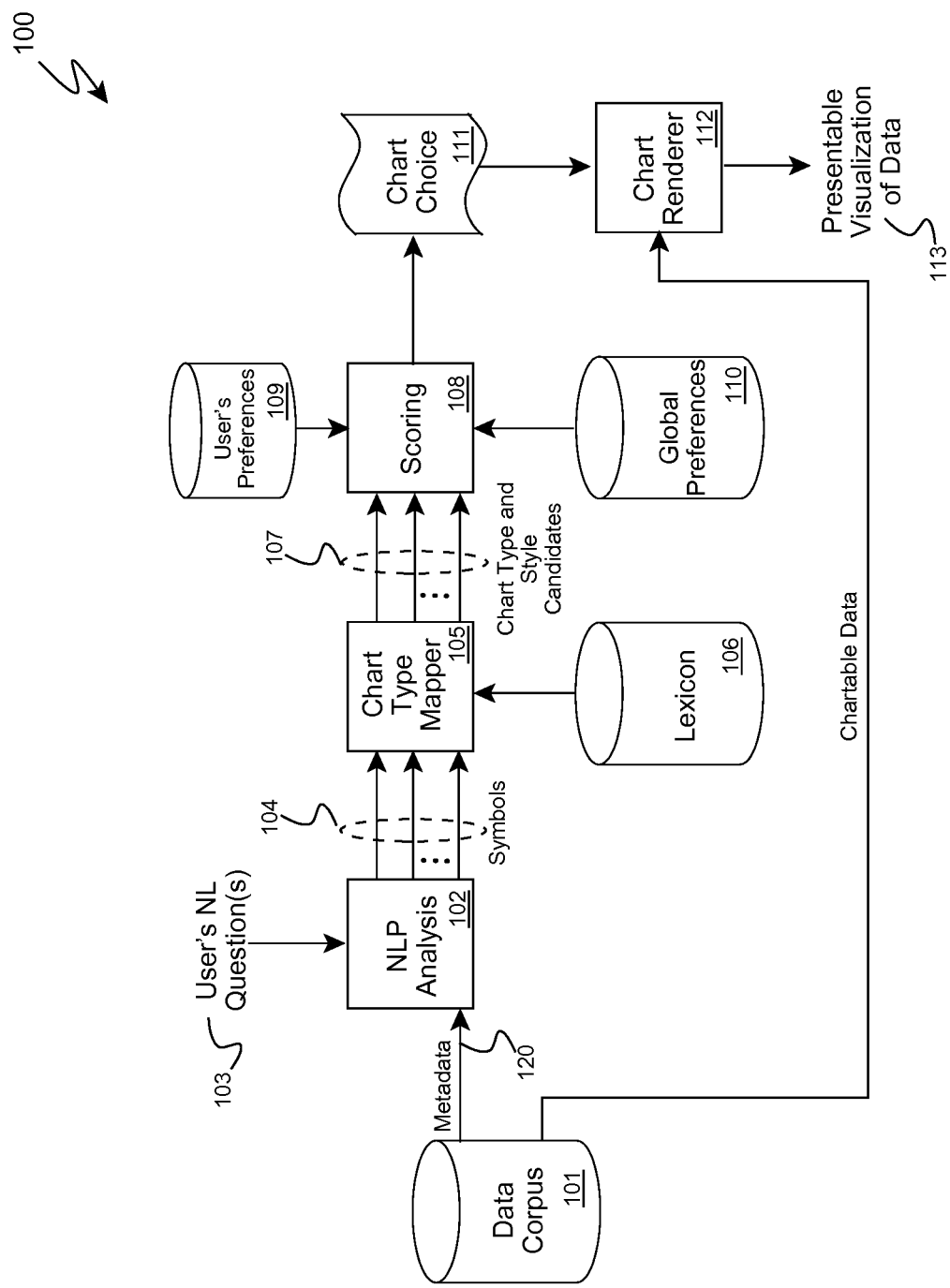
FIG. 1 illustrates a system embodiment according to the present invention.

The inventors of the present invention have recognized a problem not yet recognized or solved by those skilled in the relevant arts. While there are ample tools available to generate charts from data, each of them requires a certain level of expertise by the user to select the "best" chart for the intended use (e.g. investigate a property of the data or demonstrate a property of the data), or some amount of knowledge about a characteristic inherent in the data. To know which chart type to select, one must refer currently to a wide range of expert advice sources, from blogs to text books. To know more about the data, one must currently produce multiple visualizations in the hope that one or more of them reveal or show an unknown characteristic or property of the data.

For example, business analysts want to quickly gain insight into certain data sets without having an extensive mathematical or charting theory background. The amount of available data in the world is increasing exponentially, and business analysts need to analyze their data quickly to get business insight and to take action before others take action or before the data becomes stale. The time to gain insight is increased by the need to understand how to build the right chart for a given data set. Consider this example in which a business analyst has a list of 100 people who attended a conference event, as well as information about those people, and the business analyst wants to quickly gain insight about these participants by using charts. Currently, the analyst would need to select a chart type, gather or input the data, and then use a charting tool to create the selected chart type from the gathered data. A business analyst who is not well-versed in a wide variety of chart types (e.g. bar, pie, scatter, line, stacked bar, time series, correlation, comparison, parts-of-the-whole, heat maps, etc.) will have difficulty selecting the best option of chart types to generate from the data. The business analyst, however, can express in natural language what he or she would like to "see" about the data in a digital visual presentation ("visualization"), such as:

"How many participants came from each country?"

The present inventors set out to develop a data visualization tool which could receive a data set to be visualized, and instead of receiving an explicit chart type selection from the user, it would receive a natural language query or command, which would be processed by the new tool to automatically select an optimal visualization format for the user (or set of optimal visualizations). This would allow a user, such as the foregoing business analyst, to effectively investigate or demonstrate properties of the data without having to be an expert in charting theory, communication theory, and without having to browse a large number of visualizations to see which ones might or might not illustrate relevant characteristics and properties of the data.

Review of the Available Technologies.

The present inventors, having recognized this unsolved problem, then attempted to locate available technology to perform this proposed tool function, and found none suitable. For example, United States published patent application 2011/0080408 A1 to Neelakantan, et al., selects chart types by consulting a single user's preferences, but it does not consider what is optimal from a query in natural language about the subject data set. Similarly, United States published patent application 2009/014422 A1 to Miklos, et al., uses metadata supplied with the data corpus to select a chart type, but it cannot determine an optimal chart type from a natural language query, either. And, IBM's RAVE™ product offers a chart-generating application programming interface (API), also available as Many Eyes™ in the format of a web-based service, generates thousands of types of data visualization, but it does not automatically select one or more optimal visualization formats based on a natural language query about the subject data set or data corpus.

Overview of the Embodiments of the Invention

The new data visualization tool uses natural language processing and data analytics to determine the optimal possible chart(s) for a given set of input data (e.g. "data set", "data corpus"). Embodiments of the present invention make use of any available description of the data and a question about that data to automatically select and generate one or more optimal visualizations. The metadata may be information such as row and column names, database field names, a eXtensible Markup Language (XML) document type definition (DTD), an XML schema, etc. The user-provided question may be a query or statement expressed in natural language (NL), such as "How do customer account deposits follow stock market indices on a daily basis?", or "What is the breakdown by customer net worth value of daily customer account balances?"

Using a natural language processor (NLP), the metadata (if available) and the user-supplied query are parsed to find keywords and phrases (e.g. NL elements). Then, those elements are subjected to mapping and weighting processes by a computer to select one or more optimal chart types. Next, a chart generating API or cooperative computer function is called or invoked on the data with the chart type selection(s), and the visualization(s) are returned to the user.

This approach is generalizable and repeatable, as it does not rely on a single user's preferences but rather universal truths about the data in question. Additionally, it requires no special pre-processing by the data provider. An advantage of this system is that this tool can quickly provide insight into data for a business analyst, scientist, researcher, trader, administrator, government official, consumer, student, health care investigator, or law enforcement investigator without the need for them to go through the definition and choice of which type of visualization is required. It in essence expedites a user's request for insight about any given data without having a high-level of expertise in charting theory or a high-degree of intuition about characteristics of the data set.

Architectural Overview

Turning to FIG. 1, a system diagram (100) is shown of at least one embodiment according to the present invention. A data set or corpus (101) may be input to the tool by a user or another process, optionally including metadata (120) about the data set. Such metadata may be as simple as row and column labels for a spreadsheet, or any number of other metadata formats which are well-known in the arts (e.g. DTD, schemas, etc.).

Figure 4:
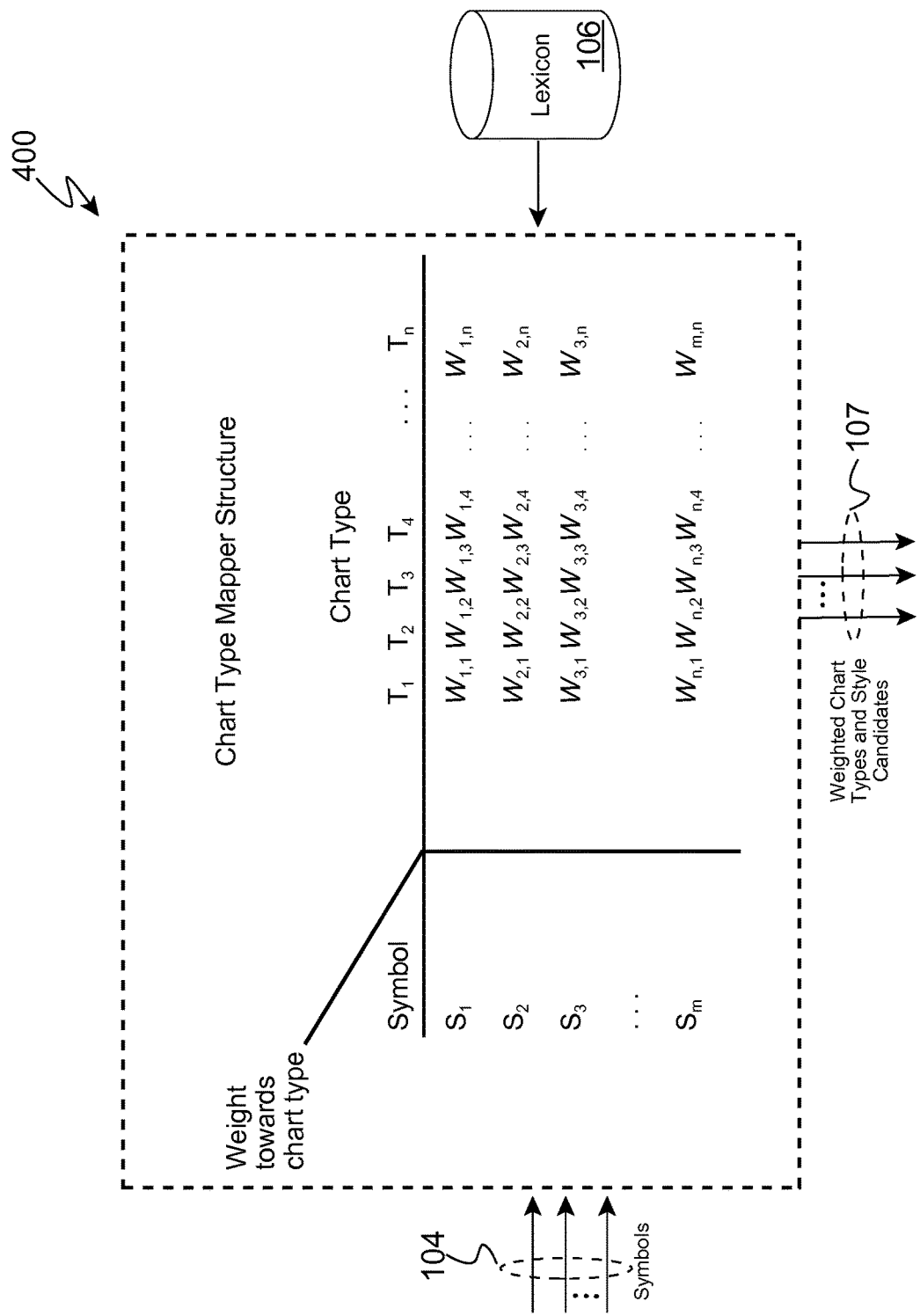
FIG. 4 illustrates a mapping structure for symbols to chart types with weighting values.

A user-provided query is received in natural language into a Natural Language Processor (102), optionally including the metadata, which is parsed for keywords and phrases. Symbols (or elements) (104) as found in the query and the metadata are received into a chart type mapper (105), which uses one or more lexicons (106) to identify chart type and chart style candidates. FIG. 4 illustrates a generic mapping structure (400) for a variety of m symbols ($S_1 \ldots S_m$) and a variety of n chart types ($T_1 \ldots T_n$), which can be expressed as a set of weighting values $W_{x,y}$ for any combination of symbol and chart type. For chart types which are irrelevant or meaningless to a particular symbol, the weight value may be set to zero in one embodiment. For chart types which are very relevant to certain symbols, the weight value may be set closer to 1.0, with all other levels of relevance ranging between 0.0 and 1.0.

In this particular embodiment, the lexicon (106) contains the weight values to assign to each of the found symbols (104) in the user's NL query and optionally in the metadata. A weighting calculation is then performed by a computer over all the chart types to perform scoring (108) to yield one or more optimal chart type choice(s) (111). This chart choice (111) and the data corpus (101) are then input via an API into a chart rendering computer (112), such as the aforementioned IBM RAVE engine, to yield one or more optimal, highly-relevant visualizations of data. This visualization may be in a static format, such as a digital photo or digital image file (e.g., JPG, GIFF, TIFF, etc.), a moving image file (e.g., WMV, MOV, FLASH, etc.), and 3-D interactive model such as a CAD/CAM file, or even a document format (e.g. PDF, PowerPoint slide, etc.).

The assignment of specific chart types and symbols is within those skilled in the art, such as $T_1$="bar"; $T_2$="stacked bar"; $T_3$="pie"; $T_4$="line"; $T_5$="time_series"; $T_6$="scatter"; $T_7$="box_plot"; etc.; and $S_1$="compare"; $S_2$="how many"; $S_3$="how often"; $S_3$="relative"; $S_4$="total"; $S_5$="breakdown by"; $S_6$="percentage of"; $S_7$="distribution"; etc.

The weights $w_{x,y}$ can be set to default values according to experts in the field of chart theory, such as a weight $w_{1,1}$=0.8 (symbol $S_1$="compare" mapped to chart type $T_1$=bar), and weight $w_{1,7}$=0.1 (symbol $S_1$="compare" mapped to chart type $T_7$=box_plot). Similarly, because box plots are optimal for illustration of distributive characteristics in a data corpus, weight $w_{7,7}$=0.9 (symbol $S_7$="distribution" mapped to chart type $T_7$=box_plot).

Figure 2:
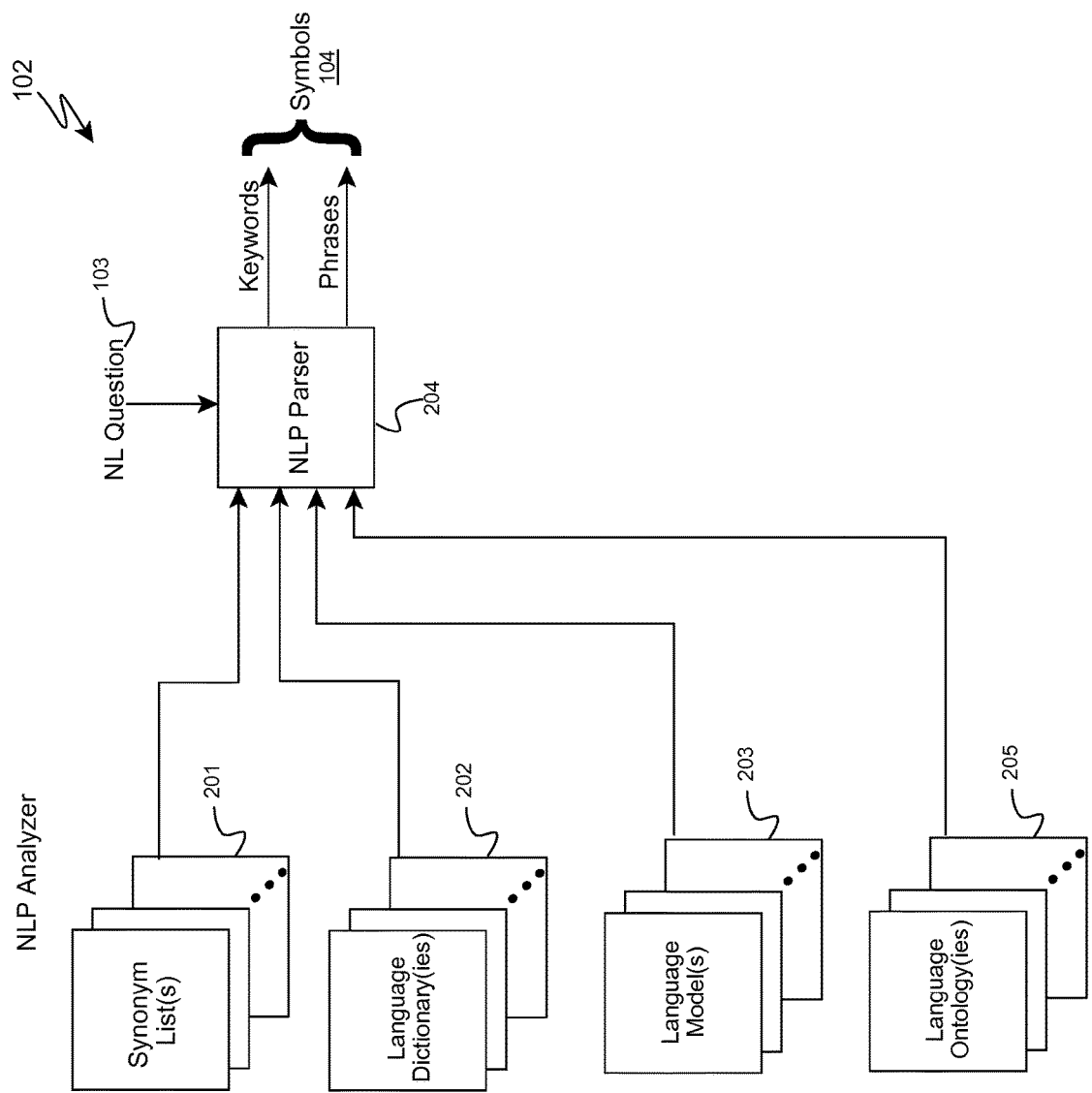
FIG. 2 sets forth particular customizations for a natural language processor according to the present invention.

Referring now to FIG. 2, internal details of the handling of the natural language query (102) according to at least one embodiment are shown. While natural language processing is fairly well understood by certain persons in the art, we present a functional diagram here in order to explain how it can be used and customized to this function to generate symbols which will be readily mapped to weights for chart types.

One or more synonym lists may assist in removing aliased meanings from the query, and to normalize the terms for mapping. For example, synonyms including contrast, juxtapose, parallel, match up, side by side, stack up against, and weigh against may be normalized to "compare" as an output symbol. Similarly, a list of synonyms sequence, repetition, cycle, prediction, etc., may be normalized to the symbol "pattern". In some circles of natural language programming expertise, this may be referred to as a mapping or translating uncontrolled language to controlled language.

Language dictionaries (202), models (203) and ontologies (205) are utilized to find phrases, especially limitation phrases. Ontologies gather symbols into higher level concepts for when other types of mapping processes don't exactly match the keyword, token, or phrase found in the natural language parse or the corpora that is related to the chart.

For example, a British English language model and dictionary may indicate that the phrase "one off" means "single instance of", such as in a maximum, minimum, or singular non-repeating event in the data. Similarly, an American English language model and dictionary may indicate that the phrase "worst case" means minimum value in the resultant data or may mean maximum values in the factor data that leads to the resultant data. Through use of expert-created language dictionaries and models, the system can interpret the natural language query from the user to more accurately identify keywords and key phrases (e.g. symbols).

Example Logical Process Performed by a Computer

The foregoing architecture for a new data visualization aid tool can be realized in at least one embodiment as follows. The system is provided tabular data which is categorized and described either by their table and column names or metadata that describes what the content represents, such as that discussed in the foregoing paragraphs. This corpus of data is typically found in databases on business repositories. The user then has the ability to ask questions in natural language about the data corpus which will then be automatically displayed in an optimal visualization format for the question and the data involved, using a logical process such as:
1. The system is initialized with one or more dictionaries, language models, synonym lists, ontologies, and symbols mapped to chart types with weight-based scores towards certain charts.
    a. A synonym table and natural language dictionary and language model is defined also for the mapping.
    b. For example, charting experts know pie charts are good for proportional values and bar charts for absolute values, so the system will be primed with synonyms of proportional and absolute with greater weights towards pie charts, etc.
2. A user-selected data corpus and optionally metadata describing the data corpus, or a data corpus from an existing repository is received into the computer-based, computer-performed process.
3. The user then inputs a question, query or statement in natural language about the data corpus.
4. The system then utilizes natural language processing to parse the user query or statement and optionally the metadata into key words and key phrases (e.g. symbols)
5. The system maps the identified symbols to weights for various chart types.
6. The system then scores the each chart type, such as by summing the weights for each chart type across all identified symbols, and selects the highest scoring chart type or types.
7. The system then pushes the data corpus and the selected chart types to a charting process or charting server, such as the IBM RAVE service, in order to have the selected chart rendered into a digital form.
8. The rendered digital chart is output to the user, to a requesting process, or into computer-readable digital storage.

Operational Examples

Figure 5:
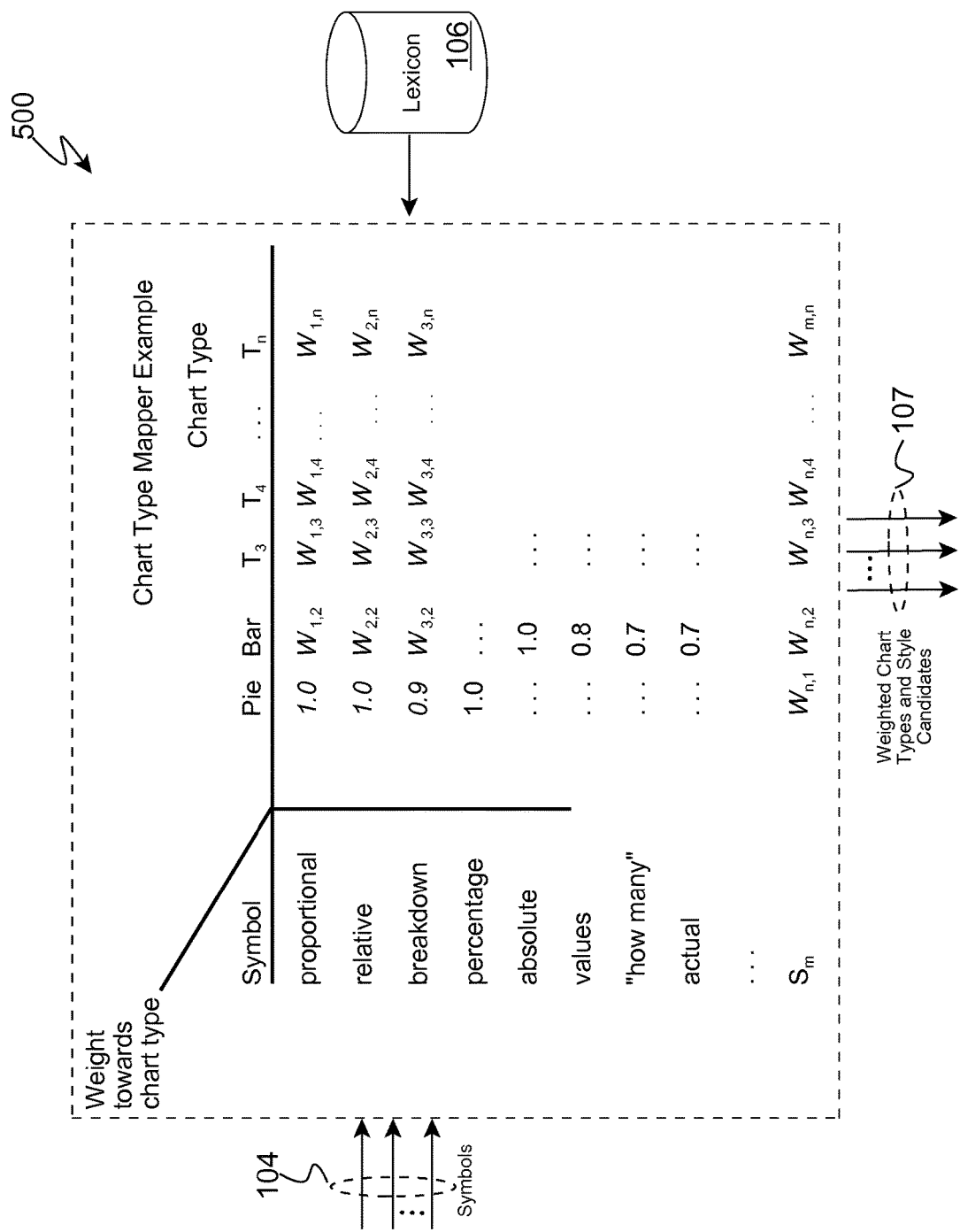
FIG. 5 shows an example system initialization state for the purposes of providing an operational example.

Consider a system initialized (500) as shown in FIG. 5. In a first example of operation, the user brings up their data in a web page or has data stored in a repository from business data. For the web example, the user enters a description of the data into an input field, and enters a natural language question about the data into a second input field. Next, the user clicks a button, the system performs the aforementioned operations, and an optimal chart is automatically selected and built for the user answering the question about their data. For repository data in a business process management system, the business analysts "asks questions" about the data, and a visualization for that data is presented to them.

Now, consider again the previous example regarding attendees to a conference event, and an analyst wishing to know the breakdown of attendees by country of origin. Suppose the data reflects answers of USA=15, Canada=10, India=5, China=9, and Brazil=4. The user might input a question such as:

"How many participants were there from each country?"

The NLP portion of the invention would identify the symbols of "how many", assign a greater weight to a "bar chart", and therefore would create a bar chart with one bar per country, and a height of each bar being the attendee count from that country.

However, consider that the user-provided question was: "What is the participation breakdown by country?

In this scenario, the system determines the phrase "breakdown" has a strong weight towards selecting a pie chart, so a pie chart is selected and rendered in which each country is represented by a wedge, the sweep of which is a percentage of attendees from the country of the total attendees to the conference.

Suitable Computing Platform

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 3:
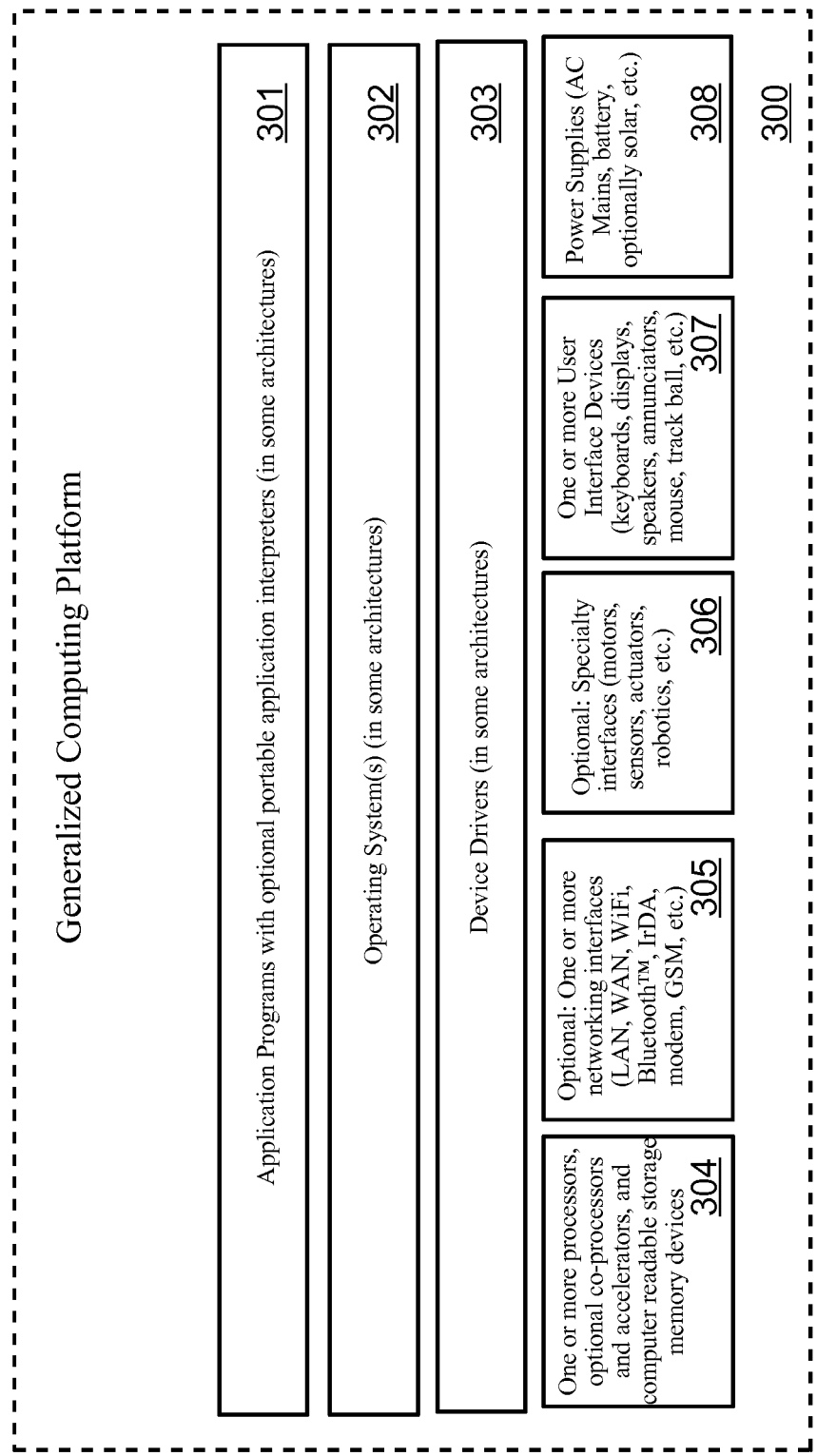
FIG. 3 sets forth a generalized architecture of computing platforms suitable for at least one embodiment of the present invention.

The present invention may be realized for many different processors used in many different computing platforms. FIG. 3 illustrates a generalized computing platform (500), such as common and well-known computing platforms such as "Personal Computers", web servers such as an IBM iSeries™ server, and portable devices such as personal digital assistants and smart phones, running a popular operating systems (302) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (301) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (304) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (305) may be provided, as well as specialty interfaces for specific applications. If the computing platform is intended to interact with human users, it is provided with one or more user interface devices (307), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method comprising:

accessing by a computer a corpus of numeric data;

priming a synonym list with a plurality of absolute weights and a plurality of proportional weights, wherein each absolute weight is associated with a symbol and one of a plurality of numeric visualization formats, wherein each proportional weight is associated with a symbol and one of a plurality of numeric visualization formats, wherein values assigned to the proportional weights and to the absolute weights reflect greater suitability for a symbol to be visualized by a corresponding visualization format;

receiving, from a user input device, by a computer, a query about a data corpus comprising a natural language expression;

identifying, by a computer, using natural language processing, one or more symbols provided within the expression;

removing, by a computer, one or more aliased meanings by translating uncontrolled language expressed by the one or more identified symbols within the expression to controlled language using one or more normalized symbols according to the primed synonym list;

inferring, by a computer, using natural language processing of the translated controlled language, using one or more of a language dictionary, a model and an ontology, identified symbols, at least one characteristic, property or relationship within the data corpus about which the user is querying but which is not explicitly stated by the user in the expression;

scoring, by a computer, each of the plurality of numeric data visualization formats according to the absolute weights and the proportional weights for each of the different numeric data visualization formats across all of the normalized symbols, wherein the different visualization formats comprise at least a plurality of different formats of charts selected from the group consisting of pie charts, bar graphs, stacked bar charts, time series plots, parts-of-the-whole illustrations, distribution charts, scattergrams, line charts, box plots, correlation charts, comparison charts, and heat maps; and generating, by a computer on a user interface device, a numeric data visualization of the corpus having a format according to the greatest scoring, wherein the format does not rely on any explicit user chart format or feature selections.

2. The method as set forth in claim 1 further comprising accessing, by a computer, metadata descriptive in natural language of the corpus, and wherein the identifying of symbols further comprises applying natural language processing to the metadata to identify a symbol selected from the group consisting of "proportion of", "relative to", "breakdown of", "percentage of", and "how many of".

3. The method as set forth in claim 2 wherein the metadata comprises row and column labels.

4. The method as set forth in claim 2 wherein the metadata comprises field labels from database records.

5. The method as set forth in claim 2 wherein the metadata comprises an extensible markup language document type description.

6. The method as set forth in claim 1 wherein the scoring calculation comprises summing by the computer of weight values for each visualization format.

7. The method as set forth in claim 1 wherein the generating of a visualization comprises generating a digital image file.

8. The method as set forth in claim 1 wherein the generating of a visualization comprises generating a digital document file.

9. The method as set forth in claim 1 wherein the generating of a visualization comprises generating a digital movie file.

10. The method as set forth in claim 1 wherein the generating of a visualization comprises generating a digital three-dimensional model file.

11. A computer program product comprising:
one or more computer readable data storage devices; and
program instructions stored by the data storage device for causing a processor to:
access a corpus of numeric data;
prime a synonym list with a plurality of absolute weights and a plurality of proportional weights, wherein each absolute weight is associated with a symbol and one of a plurality of numeric visualization formats, wherein each proportional weight is associated with a symbol and one of a plurality of numeric visualization formats, wherein values assigned to the proportional weights and to the absolute weights reflect greater suitability for a symbol to be visualized by a corresponding visualization format;
receive, from a user input device, a query about a data corpus comprising a natural language expression;
identify, using natural language processing, one or more symbols provided within the expression;
remove one or more aliased meanings by translating uncontrolled language expressed by the one or more identified symbols within the expression to controlled language using one or more normalized symbols according to the primed synonym list;
infer, using natural language processing of the translated controlled language, using one or more of a language dictionary, a model and an ontology, at least one characteristic, property or relationship within the data corpus about which the user is querying but which is not explicitly stated by the user in the expression;
score each of the plurality of numeric data visualization formats according to the absolute weights and the proportional weights for each of the different numeric data visualization formats across all of the normalized symbols, wherein the different visualization formats comprise at least a plurality of different formats of charts selected from the group consisting of pie charts, bar graphs, stacked bar charts, time series plots, parts-of-the-whole illustrations, distribution charts, scattergrams, line charts, box plots, correlation charts, comparison charts, and heat maps; and
generate, on a user interface device, a numeric data visualization of the corpus having a format according to the greatest scoring, wherein the format does not rely on any explicit user chart format or feature selections.

12. The computer program product as set forth in claim 11 wherein the program instructions further comprise instructions to access metadata descriptive in natural language of the corpus, and wherein the identifying of symbols further comprises applying natural language processing to the metadata to identify a symbol selected from the group consisting of "proportion of", "relative to", "breakdown of", "percentage of", and "how many of".

13. The computer program product as set forth in claim 12 wherein the metadata comprises one or more metadata types selected from the group consisting of row and column labels, field labels from database records, and an extensible markup language document type description.

14. The computer program product as set forth in claim 12 wherein the generating of a visualization comprises generating a visualization selected from the group consisting of a digital image file, a digital document file, a digital movie file, and a digital three-dimensional model file.

15. A system comprising:
- a processor for executing program instructions; and
- one or more computer readable data storage devices storing program instructions for causing a processor to:
    - access a corpus of numeric data;
    - prime a synonym list with a plurality of absolute weights and a plurality of proportional weights, wherein each absolute weight is associated with a symbol and one of a plurality of numeric visualization formats, wherein each proportional weight is associated with a symbol and one of a plurality of numeric visualization formats, wherein values assigned to the proportional weights and to the absolute weights reflect greater suitability for a symbol to be visualized by a corresponding visualization format;
    - receive, from a user input device, a query about a data corpus comprising a natural language expression;
    - identify, using natural language processing, one or more symbols provided within the expression;
    - remove one or more aliased meanings by translating uncontrolled language expressed by the one or more identified symbols within the expression to controlled language using one or more normalized symbols according to the primed synonym list;
    - infer, using natural language processing of the translated controlled language, using one or more of a language dictionary, a model and an ontology, at least one characteristic, property or relationship within the data corpus about which the user is querying but which is not explicitly stated by the user in the expression;
    - score each of the plurality of numeric data visualization formats according to the absolute weights and the proportional weights for each of the different numeric data visualization formats across all of the normalized symbols, wherein the different visualization formats comprise at least a plurality of different formats of charts selected from the group consisting of pie charts, bar graphs, stacked bar charts, time series plots, parts-of-the-whole illustrations, distribution charts, scattergrams, line charts, box plots, correlation charts, comparison charts, and heat maps; and
    - generate, on a user interface device, a numeric data visualization of the corpus having a format according to the greatest scoring, wherein the format does not rely on any explicit user chart format or feature selections.

16. The system as set forth in claim 11 wherein the program instructions further comprise instructions to access metadata descriptive in natural language of the corpus, and wherein the identifying of symbols further comprises applying natural language processing to the metadata to identify a symbol selected from the group consisting of "proportion of", "relative to", "breakdown of", "percentage of", and "how many of".

17. The system as set forth in claim 16 wherein the metadata comprises one or more metadata types selected from the group consisting of row and column labels, field labels from database records, and an extensible markup language document type description.

18. The system as set forth in claim 12 wherein the generating of a visualization comprises generating a visualization selected from the group consisting of a digital image file, a digital document file, a digital movie file, and a digital three-dimensional model file.

* * * * *